United States Patent

[11] 3,607,029

[72] Inventors Jean R. Goret
Antony;
Louis M. Winand, Ris Orangis, both of France
[21] Appl. No. 727,950
[22] Filed May 9, 1968
[45] Patented Sept. 21, 1971
[73] Assignees Produits Chimiques Pechiney-Saint-Gobain
Paris, France;
Union Chimique-Chemische
Bedrijuen, Brussels, Belgium, part interest to each
[32] Priority May 11, 1967
[33] France
[31] 106037

[54] CONTINUOUS PROCESS FOR SOLVENT PURIFICATION OF PHOSPHORIC ACID
7 Claims, 1 Drawing Fig.

[52] U.S. Cl. ................................................................... 23/165
[51] Int. Cl. .............................................................. C01b 25/18
[50] Field of Search .................................................. 23/22, 165

[56] References Cited
UNITED STATES PATENTS

| | | | |
|---|---|---|---|
| 1,929,443 | 10/1933 | Milligan ...................... | 23/165 C |
| 3,259,472 | 7/1966 | Rice ............................ | 23/22 X |
| 3,367,749 | 2/1968 | Koerner et al. ............. | 23/165 C |
| 3,388,967 | 6/1968 | Rumaradhya ............... | 23/165 C |
| 3,410,656 | 11/1968 | Bunin et al. ................. | 23/165 C |
| 3,072,461 | 1/1963 | Long et al. .................. | 23/165 C |
| 3,363,978 | 1/1968 | De Rooij et al. ............ | 23/165 C |
| 3,375,068 | 3/1968 | Frohlich et al. ............. | 23/165 C |

*Primary Examiner*—Oscar R. Vertiz
*Assistant Examiner*—Charles B. Rodman
*Attorney*—McDougall, Hersh, Scott & Ladd

ABSTRACT: The process for extraction and purification of phosphoric acid from impure solutions of phosphoric acid derived by acid attack of phosphate rock wherein the impure solution is first passed in countercurrent flow with an alkyl derivative of phosphoric acid for removal of phosphoric acid from the impure solution and then passing the alkyl phosphoric acid derivative containing the removed phosphoric acid in countercurrent flow with an aqueous medium whereby the latter removes purified phosphoric acid from the solution.

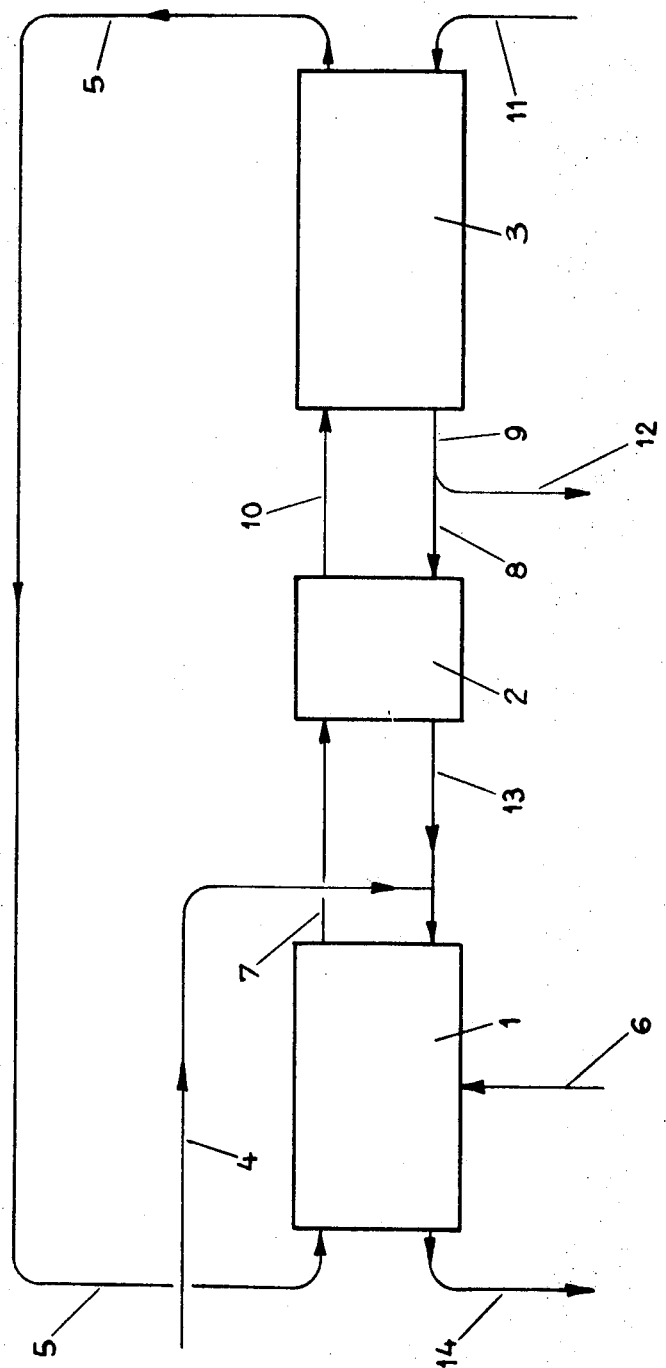

CONTINUOUS PROCESS FOR SOLVENT PURIFICATION OF PHOSPHORIC ACID

This invention relates to a continuous process for solvent purification of phosphoric acid to enable substantially complete extraction from impure solutions.

It is well known that a very large part of industrially prepared phosphoric acid is provided by attack of natural phosphated rock with sulfuric acid and that the impurities present do not prevent usage for agricultural purposes. However, a phosphoric acid of higher purity is necessary when it or its salts or derivatives thereof are intended for use in medicine, food or detersive compositions.

In order to avoid the necessity of making use of phosphoric acid obtained by the more expensive processes of combustion of phosphorus for such uses, attempts have been made to effect purification of the impure phosphoric acid obtained by acid attack on natural rock, as by extraction and purification with solvents, either by selective extraction of the phosphoric acid or by extraction of impurities from the impure solution. For this purpose, a large variety of solvents have been considered. However, it has generally been recommended to make use of some amines, some alcohols and some alkyl derivatives of phosphoric acid having high molecular weight and which are stable, nonvolatile and water-insoluble.

Notwithstanding the knowledge acquired and improvements which have led to partial successes, it has been found that there are numerous other factors which must be taken into consideration before such processes can be integrated into an industrial process for an entire wet phosphoric acid industry. For instance, because it is relatively easy, it has been proposed to extract for purification of only a part of the wet phosphoric acid while using the impure remainder in fertilizer preparations. However, numerous drawbacks result from the relationship between such fabrications whereby it becomes difficult to arrange the entire procedure in a commercial wet phosphoric acid process.

It is preferred to make use of a process for the extraction and purification of wet phosphoric acid by a solvent system which can be substantially isolated for easier exploitation and which therefore requires recovery of almost the entire amount of phosphoric acid contained in the impure solution while enabling optimum utilization of the different byproducts and residue and liquors, and it is an object of this invention to provide a method and means for achieving same.

In accordance with the practice of this invention, a continuous process is provided for the extraction of phosphoric acid as a purified and relatively concentrated solution containing more than 90 percent of the phosphoric acid originally present in the impure solution obtained from acid attack of natural phosphated rock with the extracted phosphoric acid having the desired degree of purity for uses of the types previously described. The process of this invention comprises passing the impure solution of phosphoric acid in countercurrent flow with the liquid solvent consisting essentially of an alkyl derivative of phosphoric acid in a first extraction zone consisting of a plurality of stages and introducing a strong sulfuric acid to an intermediate stage of the first extraction zone whereby phosphoric acid is removed from the impure solution to form a phosphoric acid—solvent extract, passing the phosphoric acid—solvent extract in countercurrent flow with an aqueous solution of phosphoric acid in a second extraction zone to wash the extract to form a washed extract, passing the washed extract in countercurrent flow with an aqueous medium in a third extraction zone to separate aqueous phosphoric acid in the washed extract from the solvent, subdividing the aqueous phosphoric acid extract from the third extraction zone into one increment as product and another increment for use as the aqueous wash solution passed in countercurrent flow with the extract in the second extraction zone.

The present invention includes as a new industrial product the purified phosphoric acid obtained by the process. Illustration of the process of this invention will be made with reference to the industrial preparation of purified phosphoric acid from impure phosphoric acid derived from sulfuric acid attack of natural phosphated rocks and with tributyl phosphate as the extracting solvent. The process will be described with various supplemental operations which will seem to make the process more complex than the simple process of this invention; however, it will be obvious that such supplemental operations are included better to illustrate the industrial process and its value, which concerns not only the preparation of phosphoric acid but the possibility of increasing the value of the byproducts and improving the purification. These operations are given by way of illustration and not by way of limitation of the process of this invention.

EXAMPLE

The phosphoric acid solution to be purified is provided by filtration of slurries obtained by reaction of sulfuric acid on natural phosphated rocks. The fluosilicic acid contained therein is partially separated by treatment with soda carbonate followed by filtration.

The concentrate of the solution contains 33 percent $P_2O_5$ and the following impurities calculated on the basis of the amount of $P_2O_5$:

| | |
|---|---|
| $H_2SO_4$ | 3.9% |
| Fe | 1.56% |
| V | 247 p.p.m. |
| Mn | 298 p.p.m. |
| Ca | 4,050 p.p.m. |
| Mg | 1,920 p.p.m. |
| F | 9,700 p.p.m. |
| Al | 6,600 p.p.m. |
| $SiO_2$ | 4,000 p.p.m. |
| Cr | 208 p.p.m. |
| T-R and Y | 250 p.p.m. |

In describing the process, reference will be made to the accompanying flow sheet.

An extractor 1 having an extraction zone formed of a battery of 10 stages is fed at one end through line 4 with the phosphoric acid solution to be purified at a flow rate of 9.4 m.$^3$/h. for passage through the extractor 1 in countercurrent flow with tributyl phosphate introduced at the opposite end of the extractor through line 5 at a flow rate of 75.6 m.$^3$/h. 2,040 kg./h. of 98 percent sulfuric acid is introduced into the extractor 1 through line 6 at about the fifth stage. The tributyl phosphate charged with extracted phosphoric acid issues from one end of the extractor 1 through line 7 and is fed directly to the inlet at one end of a second extractor tube having an extraction zone formed of a battery of four stages for washing by passing in countercurrent flow with a solution of pure phosphoric acid introduced from line 8 at a flow rate of 4.8 m.$^3$/h., said pure phosphoric acid being derived from the outlet pipe of a third extractor 3 having an extraction zone formed of a battery of ten stages.

The tributyl phosphate charged with phosphoric acid, freed from some of its impurities during passage through extractor 2, issues from the extractor through line 10 and enters the outlet end of extractor 3 for passage therethrough in countercurrent flow with deionized water introduced through line 11 at a flow rate of 13.6 m.$^3$/h.

The purified phosphoric acid issues from the extractor 3 through line 9. A part of the purified acid is cycled through line 8 for introduction into the extractor 2 while the remainder is drawn off as product through line 12 at a flow rate of 12.6 m.$^3$/h. having a $P_2O_5$ content of 26 percent. The solution of phosphoric acid circulated through extractor 2 issues from the extractor through line 13 for introduction with the impure phosphoric acid solution to be purified into extractor 1.

Tributyl phosphate issues from the outlet end of extractor 3 for recycling through line 5 as feed to extractor 1. A portion of the tributyl phosphate recycled through line 5 is continuously purified by an extractor (not shown) by passing 3.2 m.$^3$/h. in countercurrent flow with 1.6 m.³/h. of a semi-normal soda solution.

A depleted acid issues from extractor 1 through line 14 with 1.3 percent $P_2O_5$ plus all of the added sulfuric acid as well as metallic impurities. The purified phosphoric acid, issuing from extractor 3 through line 9, has the following composition in which the amount of impurities is expressed with reference to the amount of $P_2O_5$:

| | |
|---|---|
| $H_2SO_4$ | 0.5% |
| Fe | 60 p.p.m. |
| V | 4 p.p.m. |
| Mn | 1.8 p.p.m. |
| Ca | 44 p.p.m. |
| Mg | 37 p.p.m. |
| F | 1,500 p.p.m. |
| Al | 16 p.p.m. |
| $SiO_2$ | 1,500 p.p.m. |
| Cr | 8 p.p.m. |
| T-R and Y | 40 p.p.m. |

The extraction rate is 96 percent.

The current 12 of purified phosphoric acid, which can be treated with a column of activated carbon for decolorizing, is suitable for use for various preparations the pharmaceutical and alimentary qualities being obtained by well known techniques which do not form a part of this invention, and by means of treatment with long chain amines dissolved in kerosene for removal of any remaining anionic impurities, with any traces of arsenic being removed by hydrogen sulfide.

The stream 14 of depleted acid can be subjected to extraction treatments with solvent for removal of rare earths, yttrium and other contained metals, if present in amounts to justify such separation. In order to improve the economy of the process, the stream 14 containing all of the added sulfuric acid can be employed as a wash for gypsum cake resulting from the filtration of the initial slurry.

It will be apparent that there is provided a simple, efficient and economical continuous process for the recovery and purification of phosphoric acid from impure solutions in which various of the ingredients employed in the purification process are recycled through the process for more efficient utilization thereof.

It will be understood that changes may be made in the details of operation without departing from the spirit of the invention, especially as defined in the following claims.

We claim:

1. A process for extraction and purification of more than 90 percent of the phosphoric acid contained in an impure solution obtained by sulfuric acid attack of phosphate rock comprising passing the impure solution of phosphoric acid in countercurrent flow with a liquid solvent consisting essentially of an alkyl derivative of phosphoric acid in a first extraction zone consisting of a plurality of stages and introducing strong sulfuric acid to an intermediate stage of the first extraction zone whereby phosphoric acid is removed from the impure solution to form a phosphoric acid-containing solvent extract, passing the phosphoric acid-containing solvent extract in countercurrent flow with an aqueous solution of phosphoric acid in a second extraction zone to wash the extract to form a washed extract, and passing the washed extract in countercurrent flow with an aqueous medium in a third extraction zone to separate aqueous phosphoric acid in the washed extract from the solvent.

2. The process as claimed in claim 1 which includes the step of recycling the solvent issuing from the second extraction zone to the first extraction for passage in countercurrent flow with the impure solution of phosphoric acid.

3. The process as claimed in claim 1 in which the strong acid added at an intermediate stage of the first extraction zone is sulfuric acid.

4. The process as claimed in claim 1 which includes the step of treating the product from the third extraction zone with activated carbon to decolorize the product.

5. The process as claimed in claim 1 which includes the step of treating the product from the third extraction zone with long chain amines to remove anionic impurities.

6. The process as claimed in claim 1 which includes the step of extracting the depleted solution from the first extraction zone solvents to recover rare earths and yttrium.

7. A process as defined in claim 1 which includes the step of subdividing the aqueous phosphoric acid from the third extraction zone into one increment as a product and another increment as a wash, and passing the wash increment to the second extraction zone for countercurrent contact with the phosphoric acid-containing solvent extract.